United States Patent
Morriss et al.

(10) Patent No.: US 7,252,250 B2
(45) Date of Patent: Aug. 7, 2007

(54) METHOD AND APPARATUS FOR EXTRACTING TONER FROM TONER CARTRIDGES

(75) Inventors: Stephen Morriss, Victoria (AU); Graham Badman, New South Wales (AU); Jim Badman, New South Wales (AU)

(73) Assignee: Close The Loop Technologies Pty, Thomastown, Victoria (AU)

( * ) Notice: Subject to any disclaimer, the term of this patent is extended or adjusted under 35 U.S.C. 154(b) by 0 days.

(21) Appl. No.: 10/517,681

(22) PCT Filed: Jun. 13, 2003

(86) PCT No.: PCT/AU03/00745

§ 371 (c)(1),
(2), (4) Date: Dec. 10, 2004

(87) PCT Pub. No.: WO03/106938

PCT Pub. Date: Dec. 24, 2003

(65) Prior Publication Data

US 2005/0174406 A1      Aug. 11, 2005

(30) Foreign Application Priority Data

Jun. 13, 2002    (AU) .................................. PS2919

(51) Int. Cl.
    *B02C 19/00*    (2006.01)
(52) U.S. Cl. ..................... 241/19; 241/24.15; 241/31; 241/79; 241/79.1
(58) Field of Classification Search .................. 241/18, 241/24.15, 79, 79.1, 31, 19
See application file for complete search history.

(56) References Cited

U.S. PATENT DOCUMENTS 6,311,904 B1    11/2001   Leturmy et al.
6,467,706 B1 *  10/2002   Jaimes et al. .................. 241/18

FOREIGN PATENT DOCUMENTS

| JP | 406106090 A | * | 4/1994 |
| JP | 2001-205245 | | 7/2001 |
| JP | 2001-300331 | | 10/2001 |
| JP | 2002-079125 | | 3/2002 |

* cited by examiner

*Primary Examiner*—Mark Rosenbaum
(74) *Attorney, Agent, or Firm*—Patton Boggs, LLP

(57) ABSTRACT

The invention provides a method and apparatus for recycling toner cartridges. A shredder breaks up the toner cartridges into pieces, thereby releasing any toner from within the otherwise substantially sealed cartridges. The toner pieces along with any free toner powder are then fed through a separation stage including a mechanical separator and a trommel separator. Each separator employs a sifting screen, which allows smaller particles to fall through the screen while holding back the larger pieces. Both separators agitate the pieces to mobilize the smaller particles. A vacuum extraction system is used to withdraw air from around the cartridge pieces and an air ionizer is included for feeding ionized air into the apparatus to reduce any static electronic charge buildup. The toner is then removed from the extracted air by a dust collector.

46 Claims, 5 Drawing Sheets

METHOD AND APPARATUS FOR EXTRACTING TONER FROM TONER CARTRIDGES

CROSS-REFERENCE TO RELATED APPLICATIONS

This application is a U.S. national counterpart application of international application serial no. PCT/AU03/00745 filed Jun. 13, 2003 which claims priority to Australian serial no. PS 2919 filed Jun. 13, 2002.

FIELD OF THE INVENTION

The present invention relates generally to recycling of toner cartridges, and more particularly to the separation of materials during the recycling of toner cartridges.

BACKGROUND OF THE INVENTION

The invention has been developed primarily for use in extracting toner powder from toner cartridges, and will be described predominantly with reference to this application. It will be appreciated, however, that the invention is not limited to this particular field of use, being also applicable to other applications where separating a powder material from larger pieces is required.

Toner printing technology has been almost universally adopted in photocopiers and computer printers. These devices commonly have an internal reservoir for storing toner powder which is used in the printing process. Initially, these reservoirs were fixed to the machine and required manual refilling by pouring toner from a refill packet. Nowadays, in an attempt to limit direct contact with the messy toner powder, replaceable toner cartridges have largely superseded refillable reservoirs. Cartridges are filled in a factory where the distribution of toner powder can be strictly controlled to minimise and isolate spillage.

The popularity of disposable cartridges has meant the number of cartridges discarded has increased exponentially in recent years. Used cartridges may, in some cases, be recycled and recharged a number of times by a specialist reconditioner. Eventually however, all cartridges are either stripped down for their materials or more often, thrown out altogether. Either of these alternatives presents their own particular problems.

The cartridges are generally a combination of thermoplastic resins and ferrous and non-ferrous metals. These materials are slow to break down naturally and thus present a significant environmental pollutant. In addition, it is rare that toner cartridges are entirely empty when they are replaced. Often 5% to 10% of the toner capacity of the cartridge remains when discarded. This figure can be as high as 100% if the cartridge is faulty, has been superseded or past its use by date. The residual toner also presents a significant environmental hazard when the cartridges are thrown out. However, whilst toner along with the materials which make up the cartridges are recyclable, the nature of toner powder makes stripping the cartridges difficult.

Toner is a very fine powder and will readily become airborne and circulate with airflow. As such it can be easily inhaled and may be a significant health issue with workers. Moreover, as with many fine powders, when airborne, in the right concentration and conditions it can ignite and explode.

Currently the stripping and materials separation of cartridges is carried out manually. This not only places those doing the stripping in a high risk environment, it is also labour intensive and expensive. In modernised countries, which are the greatest users of these printer cartridges, labour cost are high meaning the manual dismantling of cartridges is not cost effective.

It is an object of the present invention to overcome or ameliorate one or more of these disadvantages of prior art, or at least to provide a useful alternative.

DISCLOSURE OF THE INVENTION

In a first aspect, the invention provides a method of extracting toner from toner cartridges, said method including the steps of:

breaking up toner cartridges into pieces to release toner from within the cartridges;

passing the cartridge pieces over a sifting barrier so that only particles under a predetermined size pass through the barrier;

agitating the pieces to mobilise the toner;

extracting air from adjacent the pieces to remove airborne particles; and removing toner from the air extracted from adjacent the pieces.

According to another aspect, the invention includes an apparatus for extracting toner from toner cartridges including:

a shredder for breaking up toner cartridges into pieces and to thereby release toner from within the cartridges;

a sifting barrier for sifting the cartridge pieces so that only particles under a predetermined size pass through the barrier;

agitation means to agitate the pieces and mobilise the toner;

an extractor for extracting air from around the sifting barrier to remove airborne particles; and a toner collector for recovering toner extracted by the extractor.

Preferably, the invention includes an ioniser for introducing ionised air into the apparatus.

Preferably, the agitating means is a trommel which repeatedly lifts and drops the pieces.

Preferably, the trommel includes an inner drum adapted to rotate about its longitudinal axis and an outer cover, the inner drum having a plurality of apertures and functioning as a separation screen so that only particles under a predetermined size pass through the screen and into the outer cover.

Preferably, the sifting barrier is a vibrating screen, substantially enclosed by a casing and more preferably, the extractor extracts air from the casing through the vibrating screen to encourage particles under a predetermined size to pass therethrough.

Preferably, a classification column separates toner powder from impurities.

BRIEF DESCRIPTION OF THE DRAWINGS

A preferred embodiment of the invention will now be described, by way of example only, with reference to the accompanying drawings in which.

PREFERRED EMBODIMENTS OF THE INVENTION

Figure 1:
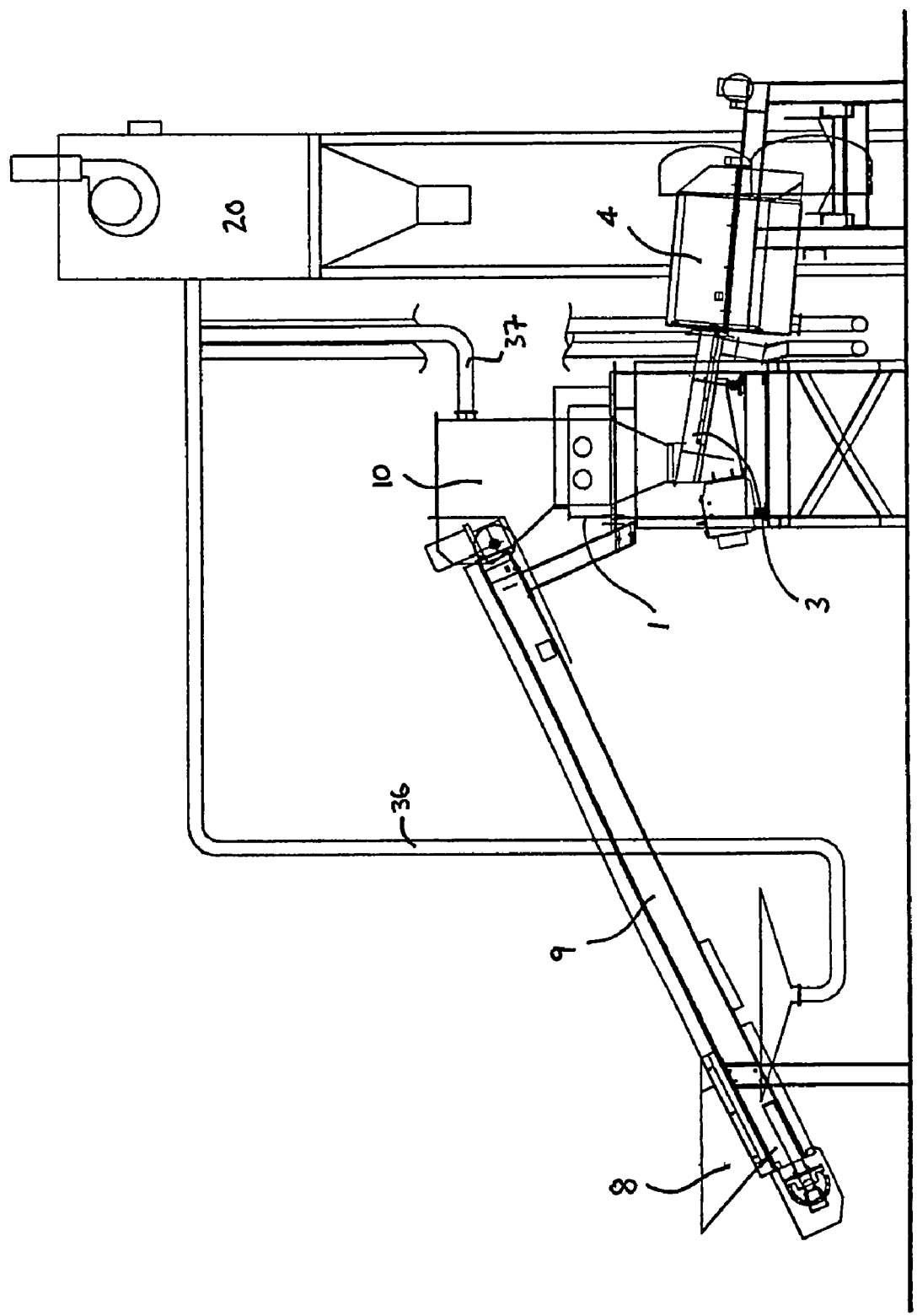
FIG. 1 is a front view of an apparatus for extracting toner from toner cartridges in accordance with the invention.
Figure 2:
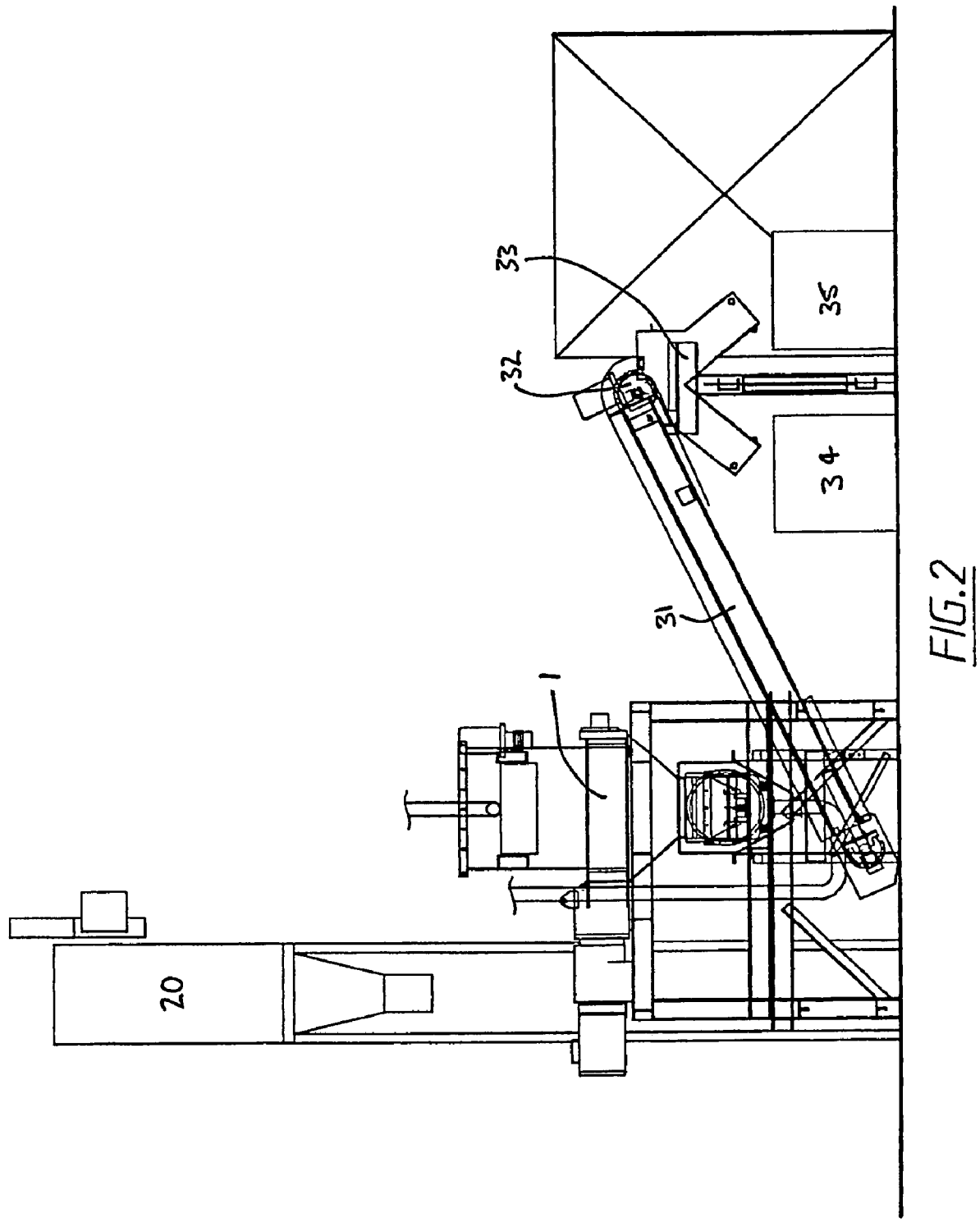
FIG. 2 is side view of the apparatus shown in FIG. 1.

Referring to the drawings, in general terms the invention provides a method and apparatus for the extracting toner from toner cartridges. While the forgoing description refers to toner cartridges, it will be appreciated that this term is intended to also include refill bottles and vessels.

The apparatus includes a shredder 1 for breaking the toner cartridges into pieces, thereby releasing any toner from within the otherwise substantially sealed cartridges. The toner pieces along with any free toner powder are then fed through a separation stage generally shown as 2 in the figures. The separation stage includes a mechanical separator 3 and a trommel separator 4. Each separator employs a sifting screen, numbered 5 and 6 respectively, which allow smaller particles to fall though the screen while holding back the larger pieces. Both separators agitate the pieces to mobilise the smaller particles. The mechanical separator provides a high frequency vibration to mobilise the toner, whereas the trommel provides a lower frequency tumbling and rubbing action to liberate the toner from the cartridge pieces.

A vacuum extraction system 7 is used to withdraw air from around the cartridge pieces. This not only has the effect of encouraging the small particles through the screen, but also extracts airborne toner dust and limits the amount of dust that exits the system to the surrounding air. The apparatus further includes an air ioniser (not shown) for feeding ionised air into the apparatus to reduce any static electronic charge build up. The ionised air has the combined effect of reducing the likelihood of sparking and possible subsequent ignition of any airborne toner powder during the shredding stage and moreover, reducing any electric charge attraction between the toner and cartridge pieces further aiding in toner liberation.

To describe the process in greater detail, toner cartridges are collected and transported to the plant for recycling. Before the cartridges are processed, they may be examined to determine statistical information on the origin, number and types of cartridges as well as a checking to ensure that each cartridge is suitable for processing. The examination maybe conducted by a manual check of each cartridge or by automatic means. Automatic examination means may include a bar code and bar-code reader system, electronic data chip and reader or knowledge/image database recognition.

Referring to FIG. 1, the cartridges are then placed in a hopper 8 which feeds a conveyor belt 9. The conveyor may be substantially enclosed to prevent toner escaping to the air outside the apparatus. The conveyor 9 transports the whole cartridges to the shredder 1 which includes a shredder hopper 10 situated above the shredder 1. The shredder hopper and shredder, like the conveyor 9 may also be enclosed.

Figure 4:
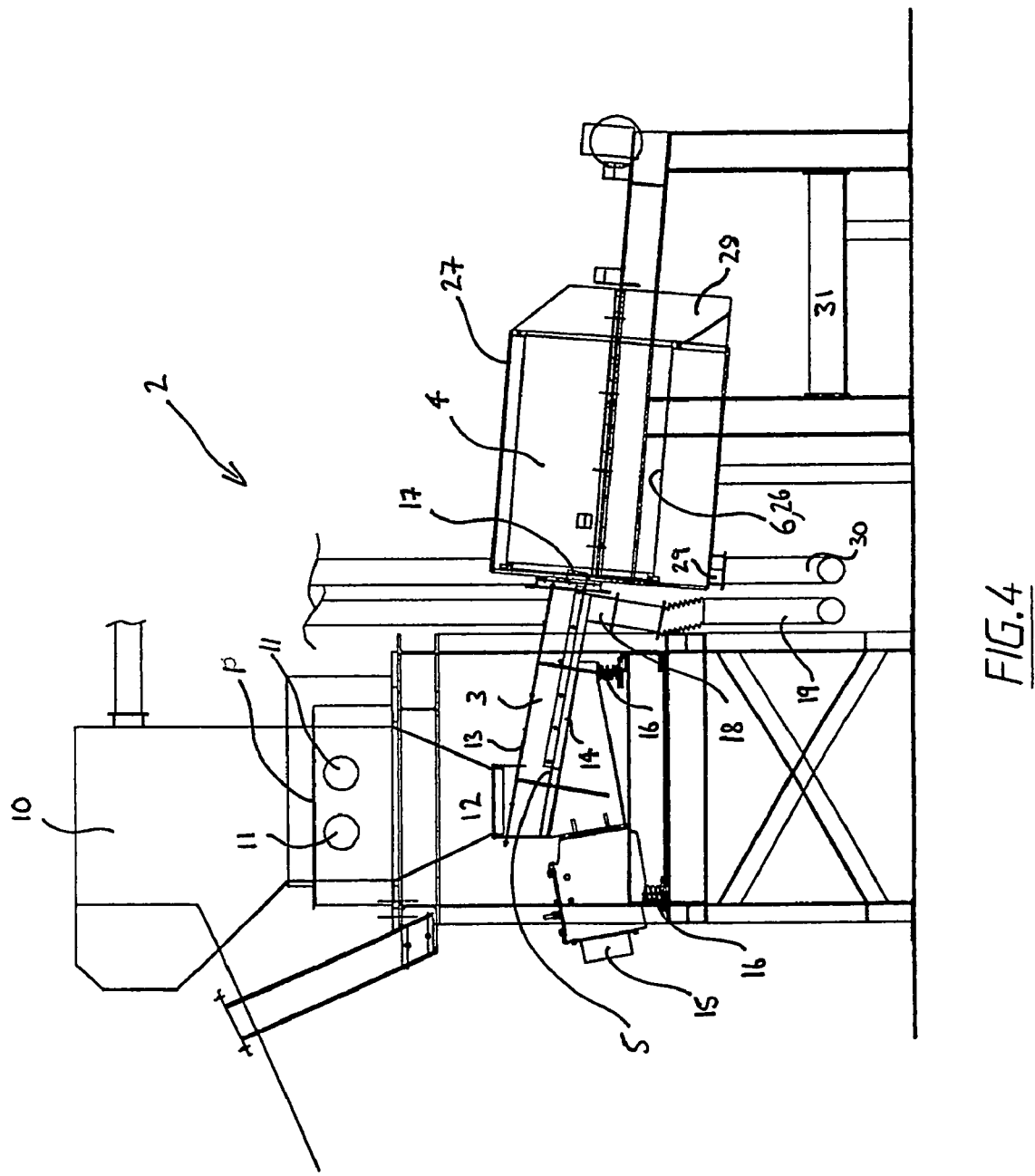
FIG. 4 is an partial, enlarged front view of the apparatus shown in FIG. 1.

Referring now to FIG. 4, the shredder employs twin parallel rollers 11 with intermeshing projections to grind the cartridges into pieces ranging in size from very small chips to pieces not exceeding 25 millimeters in width. The rollers operate at a relatively low speed of around 26 rpm in order to minimise the risk of sparking. The shredding process releases much of the toner from the cartridges however, some toner will adhere to the larger pieces of cartridge due to static charge or mechanical binding.

The toner and pieces of cartridge then drop through the shredder chute 12 and into the mechanical separator 3. The mechanical separator includes a vibrating screen 5 surrounded by a caseing 13 at the top that wraps around the lateral sides of the screen to the bottom. A tray 14 is disposed within the casing, underneath the screen. The screen is powered by an electric motor 15, which cycles the screen at around 50 Hz. The entire separator 3 is not in direct contact with the rest of the apparatus and is located on springs 16 to isolate its movement. Rubber flanges provide a seal between the shredder and the separator without passing on vibration.

The screen 5 is sloped downwardly at an angle between 5° and 20°, but preferably 10°. This slope combined with the vibration, encourages the cartridge pieces to move gradually over the screen 5 and through the separator 3 toward the separator exit 17. If the angle too small, the pieces will remain in the separator too long and slow the process unnecessarily, if the angle is too steep they will pass through too quickly and are not subjected to sufficient vibration. The high frequency vibration has the effect of mobilising the toner powder, detaching it from the larger plastic pieces. This allows the small particles including toner powder and other small impurities such as chips of plastic produced during shredding to drop through the screen 5 and into the tray 14 at the bottom of the separator 3. The tray is sloped at an angle similar to the screen such that the particles are channelled down the tray and into the duct 18.

Figure 3:
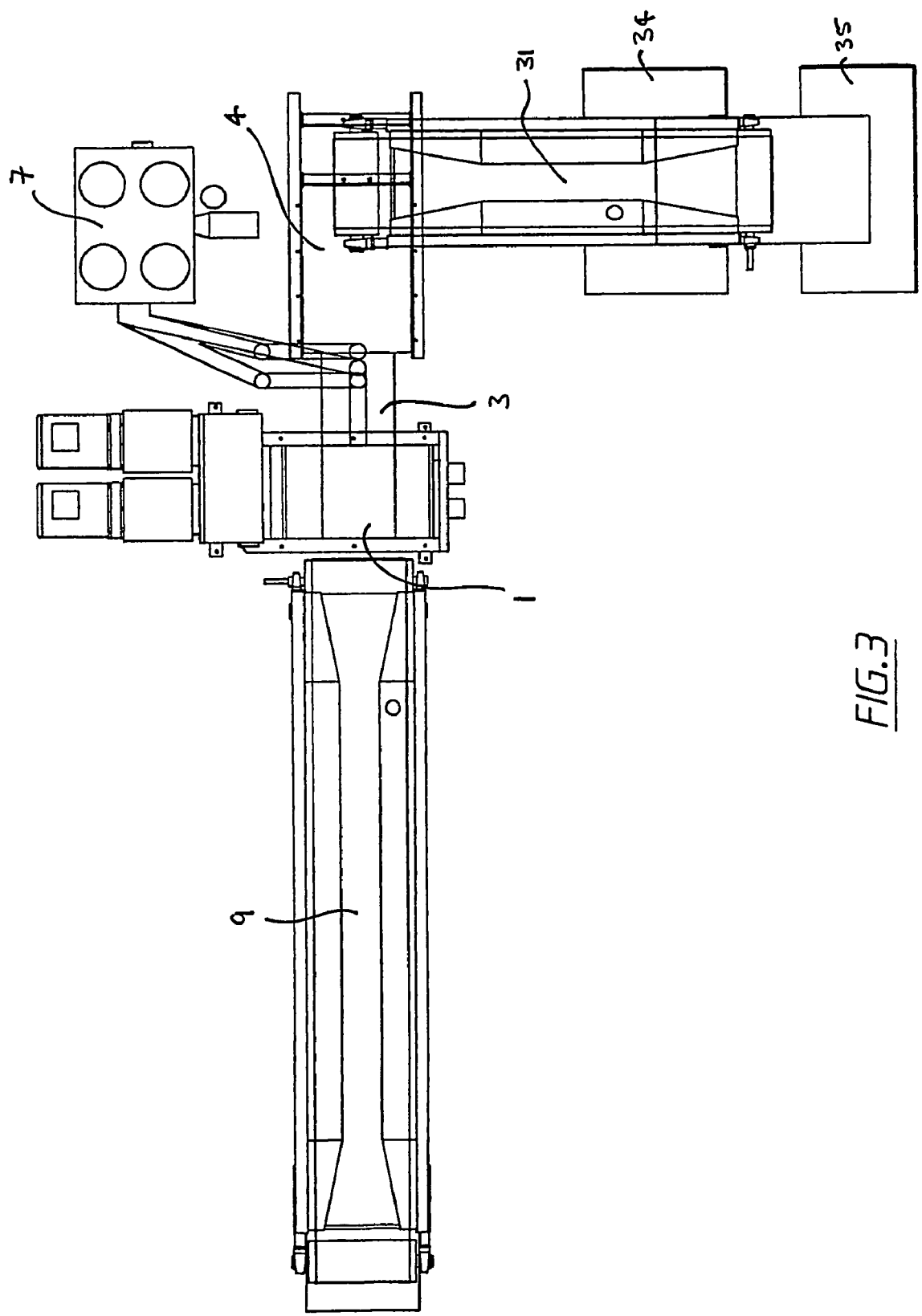
FIG. 3 is a top view of the apparatus shown in FIG. 1.

As shown in FIG. 3, the duct 18 is in turn, connected by ducting 19 to the vacuum extraction system 7, which withdraws air from the tray 14 of the separator 3. Ionised air is also introduced into the casing to pass over the pieces and through the screen. The passage of air transports the small particles through the ducting 19 and into the toner collector 20. In addition, a low static pressure is formed within the casing 3 by the vacating air. This low pressure creates a continuous airflow into the separator from outside which reduces the amount of powder and dust escaping from the separator and into the surrounding air. The small particles are carried by the airflow through the screen 5, into the tray 14 and duct 18.

Figure 5:
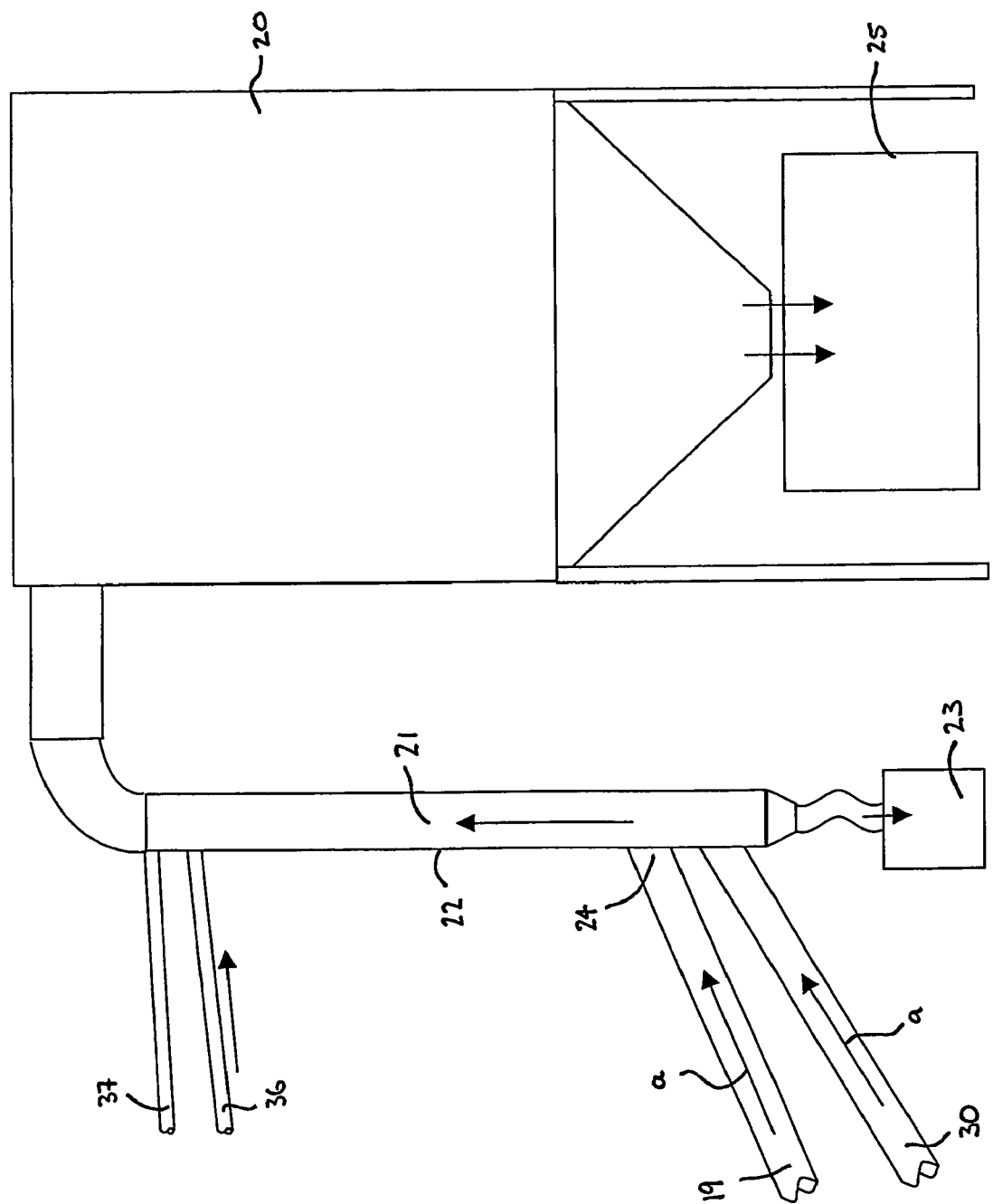
FIG. 5 is a side view of a filtering system in accordance with the invention.

Before reaching the toner collector 20 the withdrawn air, toner and small impurities are passed into a classification column 21 shown in FIG. 5. The classification column 21 separates the very small and light powder particles from the relatively larger, small toner chips and impurities. The ducting 19 from the separator 3 is connected to the bottom of a vertical column or chimney 22. The chimney has a bin 23 at the bottom, below the ducting join 24. As shown by arrow a, the small particles are drawn into the chimney along with the airflow. The airflow being regulated to have sufficient velocity to draw the small light toner dust up the chimney 22, and into the toner collector 20, whilst not being strong enough to lift the comparatively heavier chips. The required airflow rate is dependent on a range of factors including toner mass and size, chip mass and size, and air humidity, density and temperature. The chips fall down the chimney 22 and are collected in the bin 23 at the bottom of the chimney. In this way most of the impurities can be effectively filtered from the toner before it enters the toner collector 20.

The toner collector 20 may be a standard or modified dust extraction/collector unit where the small toner particles are removed from the air and collected in storage bin 25. Further processing of these particles to purify the toner dust may be necessary at a later stage.

Any pieces, which do not fall through the screen, are passed from the mechanical separator exit 17 into the trommel 4. The floor of the trommel is set below the level of the floor of the vibrating screen so that the pieces of cartridge along with any powder must drop down into the trommel. As is known in the art, the trommel includes an axially rotating, perforated inner drum 26 and a surrounding outer cover 27. The inner drum is orientated so that its bottom side is sloped slightly downwardly, approximately 10 degrees off horizontal. This slope and the rotation advance the cartridges pieces through the drum 26 toward the trommel exit 28. The drum rotates so that the pieces are raised up the side of the drum 26 before falling back to the bottom. This tumbling action may be enhanced by small protrusions and longitudinal ribs on the inside surface of the drum which catch and raise the pieces. The agitation motion of the trommel, along with the initial drop into the trommel, acts to mobilise any small particles.

The inner drum 26 also acts as a separation screen; the perforations allow smaller particles to pass through drum 26 wall and into the space between it and the outer cover 27. At the bottom of the cover, an air duct 29 is connected to the extraction system 7 by ducting 30 to withdraw the particles along with air from within the cover. As before, the airflow has the effect of encouraging small particles to pass from the inner drum 26 into the cover as well as reducing the likelihood that airborne particles will escape from the trommel.

It will be appreciated that the trommel may be replaced by an alternative means for agitating the cartridge pieces. However, alternative device should provide a similar tumbling and rubbing action.

In addition ionised air may also be injected into the trommel.

The small particles collected from the trommel 4 are passed into the classification column and filtered in the toner collector 20 and stored.

The remaining larger cartridge pieces, now substantially excluding toner dust and small particles exit the trommel 4 onto a second conveyor 31. At the end of the conveyor 31 a magnetic head pulley 32 and twin chute assembly 33 substantially separates the ferrous metal components from the other components into bins, 34 and 35 respectively.

The conveyor 9, shredder 1, casing of the mechanical separator and cover of the trommel may all be individually and together, substantially sealed, such that the process from start to exit of the trommel is isolated from the surrounding air. In this way, airflow into and out of the system can be regulated.

Additional air ducts can be added to extract air from the system or its surroundings at any point where particle concentration may be high. For instance, air may be drawn from the conveyor 9 and/or shredder hopper 10 through ducting 36 and 37 respectively. In this way, the air surrounding the invention remains substantially free of particles, or at least in concentrations which are not hazardous to workers and do not present a risk of explosion.

In alternative embodiments, or compressed air is injected into the separators or shredder chute. The compressed air is directed to blow the powder from the larger pieces.

It will be appreciated that the invention provides a largely automated method and apparatus for extracting toner powder from toner cartridges. The invention enables the materials of cartridges to be recycled quickly, in a cost effective manner. Moreover, particulate concentration in the surrounding air is significantly reduced, eliminating the potential hazards of dust inhalation by workers and the risk of explosion. In all these respects, the invention represents practical and commercially significant improvement over the prior art.

Although the invention has been described with reference to specific examples it will be appreciated by those skilled in the art that the invention may be embodied in many other forms.

The invention claimed is:

1. A method of extracting toner from toner cartridges, said method including the steps of:
   breaking up toner cartridges by a shredder into pieces to release toner from within the cartridges;
   extracting air from a hopper of the shredder to collect toner particles released from the broken up cartridges;
   passing the cartridge pieces over a sifting barrier so that only particles under a predetermined size pass through the barrier;
   agitating the pieces to mobilize the toner;
   extracting air from adjacent the agitated pieces to remove airborne particles; and
   removing toner from the air extracted from adjacent the pieces.

2. The method according to claim 1 including the further step of recovering the toner for recycling.

3. The method according to claim 1 including the further step of introducing ionized air adjacent the pieces.

4. The method according to claim 1 whereby agitating the pieces involves repeatedly lifting and dropping the pieces.

5. The method according to claim 1 whereby a trommel is used to agitate the pieces.

6. The method according to claim 5 whereby the trommel includes an inner drum adapted to rotate about its longitudinal axis and an outer cover, the inner drum having a plurality of apertures and functioning as a separation screen so that only particles under a predetermined size pass through the screen and into the outer cover.

7. The method according to claim 6 whereby air is extracted from within the outer cover to encourage particles under a predetermined size to pass through the apertures in the inner drum.

8. The method according to claim 1 whereby the sifting barrier is a vibrating screen.

9. The method according to claim 8 whereby the vibrating screen is substantially enclosed by a casing and air is extracted from the casing through the vibrating screen to encourage particles under a predetermined size to pass therethrough.

10. The method according to claim 8 whereby the vibrating screen slopes downwardly on an angle from the horizontal of between 5° and 20°, to encourage the pieces to move over the screen.

11. The method according to claim 1 whereby the cartridges are broken up by the shredder operating at approximately 26 rpm.

12. The method according to claim 11 whereby the shredder employs twin rollers to break up the cartridges.

13. The method according to claim 1 including the further step of filtering air extracted from adjacent the pieces to remove particles under a predetermined size.

14. The method according to claim 13 whereby the air extracted from adjacent the pieces is passed though a classification column to separate toner powder from impurities.

15. The method according to claim 1 including the further step of collecting the cartridge pieces for recycling.

16. The method according to claim 15 including the further step of sorting the cartridge pieces into ferrous metals and non-metals/plastics.

17. The method according to claim 1 wherein passing the cartridge pieces over a sifting barrier includes vibrating the sifting barrier at a first frequency and agitating the pieces is performed at a second, lower frequency.

18. The method according to claim 1 further comprising:
isolating vibrations caused by the shredder from other structural components; and
isolating movement of the shredder.

19. The method according to claim 1 further comprising preventing air from passing between edges of the sifting barrier and the shredder and substantially preventing vibrations from passing from the shredder to the sifting barrier.

20. The method according to claim 1 further comprising feeding back information identifying the toner cartridges being broken up.

21. The method according to claim 20 wherein feeding back information includes reading a barcode disposed on the toner cartridge.

22. An apparatus for extracting toner from toner cartridges including:
a shedder including a shedder hopper, the shedder for breaking up toner cartridges into pieces and to thereby release toner from within the cartridges;
at least one air duct extending from the shedder hopper to extract airborne particles from within the shredder hopper;
a sifting barrier for sifting the cartridge pieces so that only particles under a predetermined size pass through the barrier;
agitation means to agitate the pieces and mobilize the toner;
an extractor for extracting air from around the sifting barrier to remove airborne particles; and
a toner collector for removing toner from the air extracted by the extractor.

23. The apparatus according to claim 22 including an ionizer for introducing ionized air into the apparatus.

24. The apparatus according to claim 22 wherein the agitation means repeatedly lifts and drops the pieces.

25. The apparatus according to claim 22 wherein the agitation means it is a trammel.

26. The apparatus according to claim 25 wherein the trommel includes an inner drum adapted to rotate about its longitudinal axis and an outer cover, the inner drum having a plurality of apertures and functioning as a separation screen so that only particles under a predetermined size pass through the screen into the outer cover.

27. The apparatus according to claim 26 wherein the extractor extracts air from within the outer cover to encourage particles under a predetermined size to pass through the apertures in the inner drum.

28. The apparatus according to claim 22 wherein the sifting barrier is a vibrating screen.

29. The apparatus according to claim 28 wherein the vibrating screen is substantially enclosed by a casing and the extractor extracts air horn the casing through the vibrating screen to encourage particles under a predetermined size to pass therethrough.

30. The apparatus according to claim 28 wherein the vibrating screen slopes downwardly on an angle horn the horizontal of between 5° and 20°, to encourage the pieces to move over the screen.

31. The apparatus according to claim 22 wherein the shredder employs twin rollers to break up the cartridges.

32. The apparatus according to claim 22 including a classification column to separate toner powder horn impurities.

33. The apparatus according to claim 22 including the further step of collecting the cartridge pieces far recycling.

34. The apparatus according to claim 33 including a magnetic separator or sorting the cartridge pieces into ferrous metals and non-metals/plastics.

35. The apparatus according to claim 22, wherein the sifting barrier is vibrated at a first frequency and the agitation means operates at a second, lower frequency.

36. The apparatus according to claim 22, wherein the shredder is isolated from other components of the apparatus and further including one or more isolation mechanisms coupled to the shredder and configured to isolate movement of the shredder.

37. The apparatus according to claim 22 wherein the shredder operates at approximately 26 rpm.

38. The apparatus according to claim 22 further comprising a seal disposed between the shredder and sifting barrier, the seal substantially preventing vibrations from passing from the shredder to the sifting barrier.

39. The apparatus according to claim 22 further comprising means for identifying the toner cartridges being broken up.

40. The apparatus according to claim 22 wherein the agitation means is a drum having longitudinal ribs positioned on an inside surface of the drum.

41. The apparatus according to claim 22 wherein the drum includes small protrusions positioned on an inside surface of the drum.

42. The apparatus according to claim 22 further comprising a casing extending over, around the lateral sides, and to the bottom of the sifting barrier.

43. A method of extracting toner horn toner cartridges, said method including the steps of:
breaking up toner cartridges into pieces to release toner from within the cartridges;
extracting air from adjacent the broken up pieces to remove airborne particles;
introducing ionized air adjacent the pieces;
passing the cartridge pieces over a sifting barrier so that only particles under a predetermined size pass through the barrier,
agitating the pieces to mobilize the toner,
extracting air from adjacent the agitated pieces to remove airborne particles; and
removing toner from the air extracted from adjacent the pieces.

44. The method according to claim 43 wherein breaking up toner cartridges is performed by a rotating member operating at approximately 26 rpm.

45. An apparatus for extracting toner from toner cartridges including:
a shredder including a shredder hopper, the shredder for breaking up toner cartridges into pieces and to thereby release toner from within the cartridges;
at least one air duct extending from the shredder hopper to extract airborne particles from the shedder hopper;
an ionizer for introducing ionized air into the apparatus;
a sifting barrier for sifting the cartridge pieces so that only particles under a predetermined size pass through the barrier,
agitation means to agitate the pieces and mobilize the toner;
an extractor for extracting air from around the sifting barrier to remove airborne particles; and
a toner collector for removing toner from the air extracted by the extractor.

46. The apparatus according to claim 45 wherein the shredder operates at approximately 26 rpm.

* * * * *